(12) United States Patent
Bennett

(10) Patent No.: US 7,044,186 B2
(45) Date of Patent: May 16, 2006

(54) CARPET MOLDING PROCESS

(75) Inventor: Norman Bennett, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 262 days.

(21) Appl. No.: 10/248,845

(22) Filed: Feb. 24, 2003

(65) Prior Publication Data

US 2004/0163770 A1    Aug. 26, 2004

(51) Int. Cl.
*B32B 37/00* (2006.01)
(52) U.S. Cl. .................. 156/499; 156/555; 156/582
(58) Field of Classification Search ............. 156/228, 156/499, 555, 580, 581, 582, 583.1; 264/319, 264/320, 321, 322; 425/363, 406
See application file for complete search history.

(56) References Cited

U.S. PATENT DOCUMENTS 3,150,023 A * 9/1964 Penman .................... 156/73.6
3,823,047 A * 7/1974 Colombo ................. 156/309.9
4,102,730 A * 7/1978 Staats ........................ 156/499
4,123,313 A * 10/1978 Queen et al. ............... 156/498
4,171,395 A * 10/1979 Tillotson ..................... 428/95
4,278,482 A * 7/1981 Poteet et al. ................. 156/78
5,571,368 A * 11/1996 Barge ......................... 156/359

* cited by examiner

*Primary Examiner*—James Sells
(74) *Attorney, Agent, or Firm*—Earl LaFontaine

(57) ABSTRACT

A carpet molding system includes a support structure having a receiving end and an output end. Two ovens and two receiving systems are coupled to the support structure. One receiving system receives an under-pad material through the receiving end and guides the under-pad material through one oven and through the output end. The other receiving system receives a carpet material through the receiving end and guides the carpet material through the other oven and through the output end.

18 Claims, 3 Drawing Sheets

CARPET MOLDING PROCESS

BACKGROUND OF INVENTION

The present invention relates generally to carpet molding, and more particularly, to an automobile carpet molding system and method.

Automobile carpets used for covering flooring of automobiles are typically molded, laminated products that include carpet having a padding of thermoplastic material laminated to a back surface. Either prior to or after the carpet has been molded to conform to the flooring of the automobile, a plastic or fibrous material blend, such as an under-pad, is bonded thereto.

Conventional methods for coupling or bonding sections of a carpet together typically have three principal objectives. The first objective is to provide a secure and uniform bond between the carpet and the plastic or fibrous material blend. The second objective is to affix the plastic or fibrous material blend in such a manner that the edges remain trimmed and aesthetically appealing following adhesion to the carpet. The third objective is to apply plastic or fibrous material blend having sufficient abrasion and scuff resistance to ensure that they will last at least as long as the carpet.

Typical automotive carpet systems are constructed in two-step processes where the plastic or fibrous material blend material and the carpet are formed separately, as is the case with carpets having molded under-pads. Alternatively, the under-pad is die cut and then placed into the final carpet-molding tool. Both processes, however, are expensive because they require separate under-pad tooling.

It would therefore be desirable to provide a method for carpet molding that reduces the number of steps required to couple under-padding to carpet material thereby reducing costs associated therewith.

SUMMARY OF INVENTION

The present invention provides a one-step carpet molding system and method. In one aspect of the invention, a carpet molding system includes a support structure having a receiving end and an output end is disclosed. The support structure has a first receiving system coupled thereto and adapted to receive an under-pad material through the receiving end and guide the under-pad material through a first oven and through the output end. The support structure also includes a second receiving system coupled thereto and adapted to receive a carpet material through the receiving end and guide the carpet material through a second oven and through the output end. The support structure further includes a first heater coupled thereto, the first heater and a first space substantially adjacent to the first heater define the first oven. The support structure still further includes a second heater coupled thereto and spaced apart from the first heater. The second heater and a second space substantially adjacent to the second heater define the second oven.

In a further aspect of the invention, a carpet molding method including receiving an under-pad in a first oven and a carpet in a second oven is disclosed. The under-pad and the carpet are heated simultaneously and automatically coupled together. The under-pad and the carpet are then molded.

One advantage of the present invention is that it eliminates the need for traditional under-pad tooling particularly; steel rule dies for die cutting under-pads and also compression tools utilized for molding under-pads.

Other advantages and features of the present invention will become apparent when viewed in light of the detailed description of the preferred embodiment when taken in conjunction with the attached drawings and appended claims.

DETAILED DESCRIPTION

Figure 1:
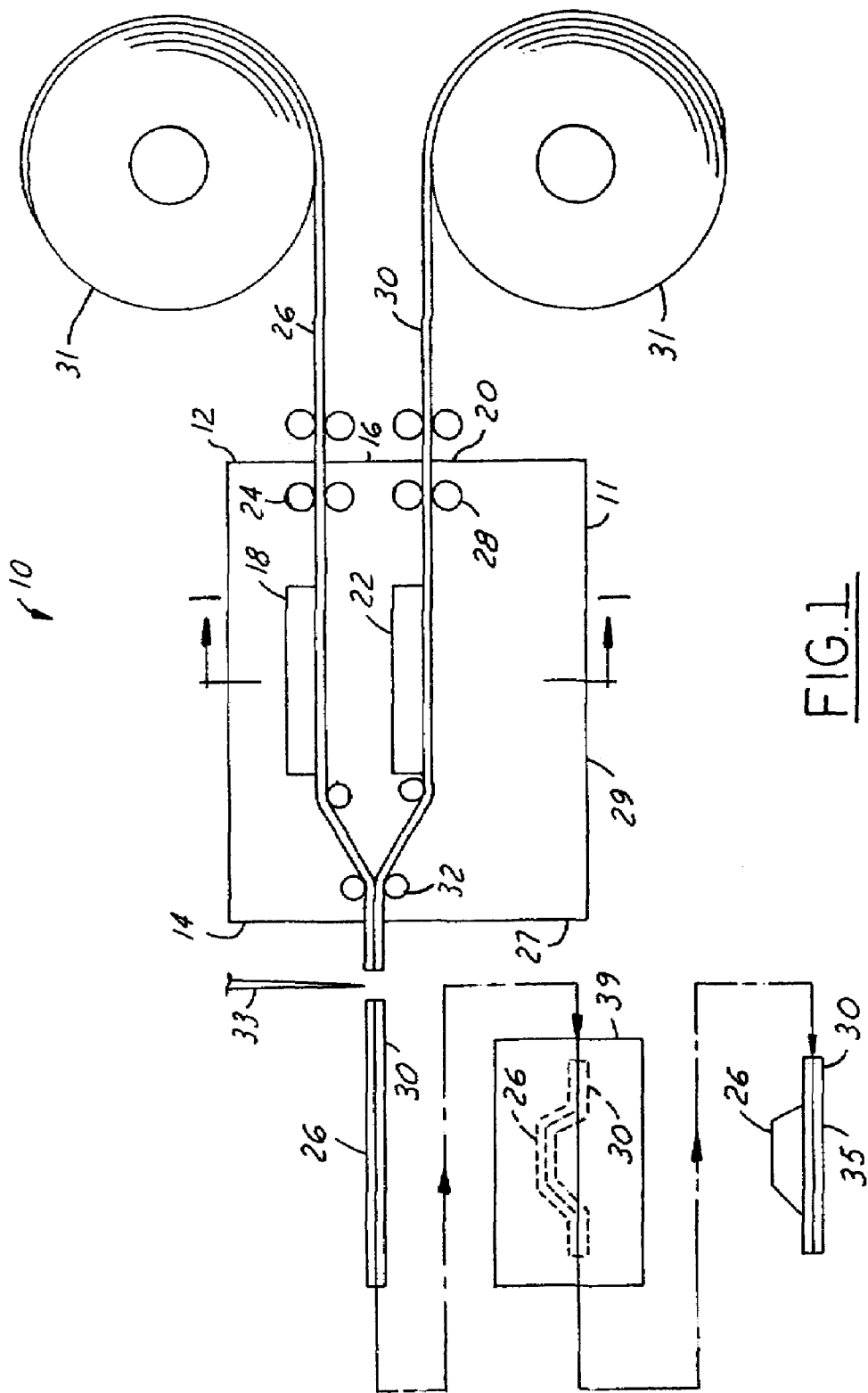
FIG. 1 is a perspective view of a carpet molding system according to an embodiment of the present invention.

In the following figures the same reference numerals will be used to illustrate the same components.

Referring to FIG. 1, a carpet molding system 10 having a support structure 11 including a receiving end 12 and an output end 14 is illustrated. The support structure 11 includes a first oven 16, including a first heater 18, coupled thereto. The first oven 16 is located between the receiving end 12 and the output end 14. The support structure 11 includes a second oven 20 also coupled thereto. The second oven 16 is located between the receiving end 12 and the output end 14 and includes a second heater 22. The support structure 11 further includes a first receiving system 24, a second receiving system 28, and a coupler 32. Positioned adjacent to or coupled with the support structure 11 is a molding tool 39.

The carpet molding system 10 efficiently molds an under-pad 26 to a carpet 30. The under-pad 26 and carpet 30 are either precut or fed in as a strip. The under-pad 26 and the carpet 30 are fed into the first and second receiving systems 24, 28 through either a manual feed 31 or a conveyor belt feed system or any alternate feed system known in the art. Subsequently, the under-pad 26 and the carpet 30 are cut by a cutting device 33, heated, and joined together to form a composite part 35 in a process detailed below.

Figure 2:
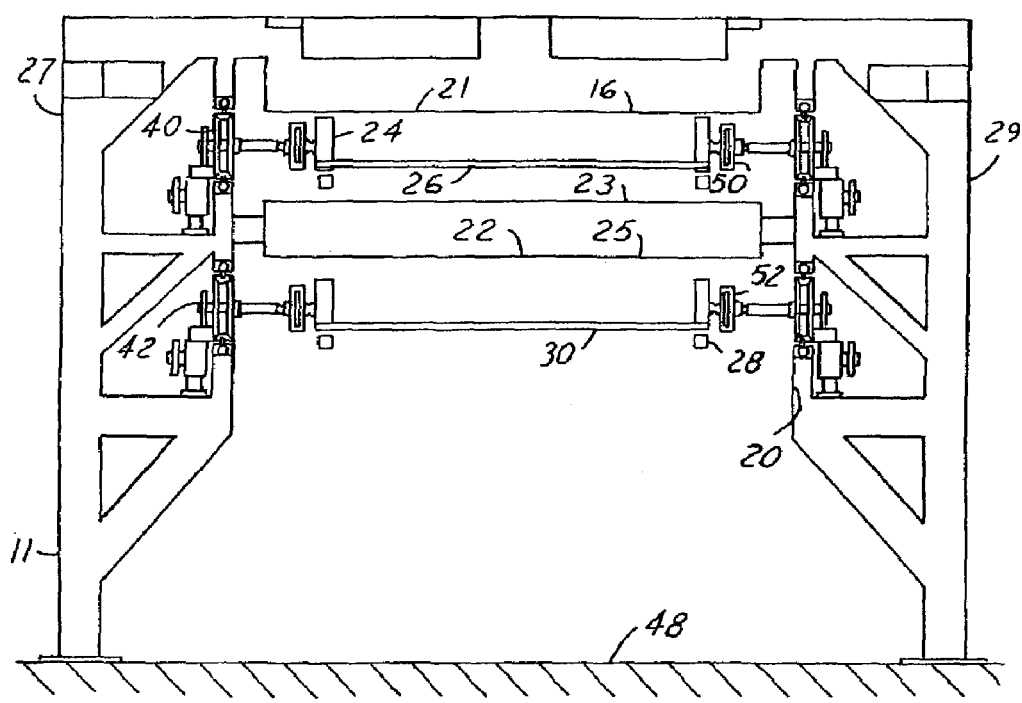
FIG. 2 is a sectional view of the carpet molding system of FIG. 1 in the direction of line 1—1.

Referring to FIGS. 1 and 2, the support structure 11 including the two ovens 16, 20, the two receiving systems 24, 28, and the coupler 32 is illustrated. The support structure 11 is composed of metal or other sturdy materials, preferably materials that are not heat-sensitive, as will be understood by one skilled in the art.

The support structure 11 also includes a first side 27 and a second side 29, between which the first heater 18 and the second heater 22 are coupled. The support structure further includes a receiving end 12 and an output end 14. In one embodiment, the receiving end 12 is either in line with or at an angle to the output end 14.

The two ovens 16, 20 or heating banks are included within the support structure 11 between the receiving end 12 and the output end 14. The first oven 16 is defined at an upper portion 21 by the first heater 18 and at a lower portion 23 by the second heater 22 or a space adjacent to the first heater 18. The space adjacent to the first heater 18 is defined as an area wherein sufficient heat is generated to prepare the under-pad 26 for coupling. The two heaters 18, 22 are held in place by the support structure 11.

The second oven 20 is defined at an upper portion 21 by the second heater 22 and at the lower portion 23 by either the support structure 11, a surface to which the support structure 11 is attached, or a space adjacent to the second heater 22. The space adjacent to the second heater 22 is defined as an area wherein sufficient heat is generated to prepare the carpet 30 for coupling. It will be understood that alternate embodiments include numerous ovens heating various alternate carpeting components simultaneously.

Between the first heater 18 and the second heater 22 is a first receiving system 24. Located between the second heater 22 and the ground 48 or section of the support structure 11 is a second receiving system 28.

The first receiving system 24 receives an under-pad material 26 through the receiving end 12 and guides the under-pad material 26 through the first oven 16 and through the output end 14. The first receiving system 24 includes a first set of clamps 50 to hold the under-pad 26 while the under-pad 26 is fed through the first oven 16. The first set of clamps 50 within the first oven 16 have a first set of side adjustment mechanisms or a first alignment system 40.

The second receiving system 28 is coupled to the support structure 11 for receiving a carpet material 30 through the receiving end 12. The second receiving system 28 guides the carpet material 30 through the second oven 20 and through the output end 14. The second receiving system 28 includes a second set of clamps 52 to hold the carpet 30 while the carpet 30 and under-pad 26 are being fed through the second oven 20. The second set of clamps 52 within the second oven 20 have a second set of side adjustment clamps or second alignment system 42.

The alignment systems 40, 42 are included to improve feedthrough of the carpet 30 or under-pad 26. The alignment systems 40, 42 also can adjust the height of the carpet 30 or under-pad 26 within the respective ovens 16, 20. Ideally, the side alignment systems 40, 42 are set at fixed heights wherein the materials that are fed through, receive necessary heat for bonding, as will be understood by one skilled in the art.

The coupler 32 is included at the second end or output end 14 of the support structure 11. The coupler 32 receives the under-pad 26 from the first oven 16 and the carpet 30 from the second oven 20 and couples the under-pad 26 to the carpet 30.

Alternate embodiments of the coupler 32 include a feedthrough mechanism that automatically couples the under-pad 26 and the carpet 30 together or a press that presses the carpet 30 to the under-pad 26 either automatically or manually. In yet another embodiment, the coupler 32 is a narrow feed area through which the carpet 30 and the under-pad 26 are fed together and automatically bonded.

The molding tool 39 receives the under-pad 26 and the carpet 30 simultaneously and further molds the under-pad 26 and the carpet 30. The molding tool 39 is embodied as a typical automotive molding tool, as will be understood by one skilled in the art. The molding tool 39 receives the under-pad 26 and the carpet 30 simultaneously and further molds the under-pad 26 and the carpet 30.

Figure 3:
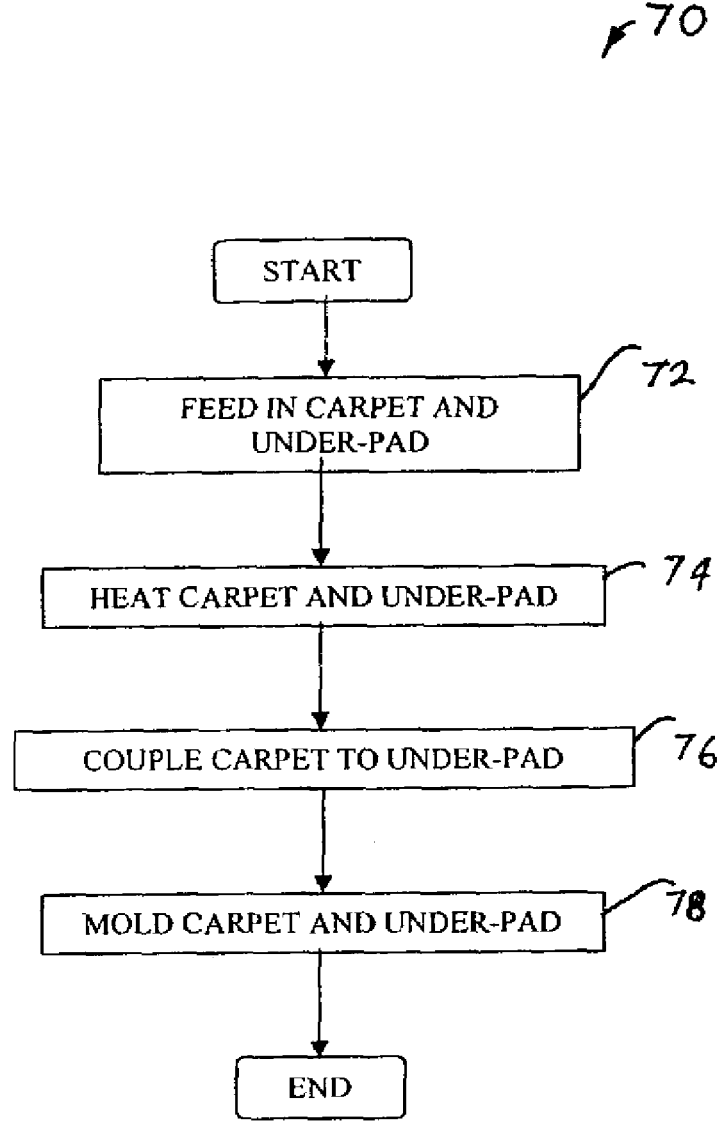
FIG. 3 is a logic flow diagram of a method for molding carpet according to the present invention.

Referring to FIG. 3, a block diagram 70 of a method for molding carpet is illustrated. Logic starts in operation block 72 when the under-pad 26 and the carpet 30 are fed into the first and second ovens 16, 18 respectively.

In operation block 74, the carpet 30 and under-pad 26 are heated to a temperature sufficient to allow bonding.

In operation block 76, the carpet 30 and under-pad 26 are cut and then coupled together either by a coupler 32 that presses or guides the carpet 30 and the under-pad 26 together.

In operation block 78, the carpet 30 and under-pad 26 combination that was previously coupled together is molded in a typical automobile carpet molding tool 39.

In operation, a carpet molding method including receiving an under-pad 26 in a first oven 16 and a carpet 30 in a second oven 20 is disclosed. The under-pad and the carpet 30 are heated simultaneously and automatically coupled together. The under-pad 26 and the carpet 30 are then molded.

While particular embodiments of the invention have been shown and described, numerous variations and alternate embodiments will occur to those skilled in the art. Accordingly, it is intended that the invention be limited only in terms of the appended claims.

The invention claimed is:

1. A carpet molding system comprising:
   a support structure comprising a receiving end and an output end;
   a first receiving system coupled to said support structure and adapted to receive an under-pad material through said receiving end and guide said under-pad material through a first oven and through said output end;
   a second receiving system coupled to said support structure and adapted to receive a carpet material through said receiving end and guide said carpet material through a second oven and through said output end;
   a first heater coupled to said support structure, said first heater and a first space substantially adjacent to said first heater defining said first oven, said first oven receiving heat from both said first heater and a second heater such that both sides of said under-pad material are heated substantially simultaneously; and
   said second heater coupled to said support structure and spaced apart from said first heater, said second heater and a second space substantially adjacent to said second heater defining said second oven.

2. A system as recited in claim 1 further comprising:
   a molding device adapted to receive said carpet and said under-pad and mold the combination thereof.

3. A system as recited in claim 1 wherein said first receiving system and said second receiving system are adapted to guide said under-pad and said carpet together, thereby coupling said under-pad to said carpet.

4. A system as recited in claim 1 further comprising:
   a manual feed into said receiving end for said under-pad and said carpet.

5. A system as recited in claim 1 further comprising:
   an automated feed into said receiving end for said under-pad and said carpet.

6. A system as recited in claim 1 wherein said receiving end is positioned either linear to or at an angle from said output end.

7. A system as recited in claim 1 wherein said first receiving system and said second receiving system are adjustable.

8. A system as recited in claim 1 further comprising:
   a coupler adapted to receive said under-pad from said first oven and said carpet from said second oven and couple said under-pad to said carpet.

9. A system as recited in claim 8 wherein said coupler is a directed feed area or a device adapted to apply pressure to said under-pad and said carpet, thereby coupling said under-pad to said carpet.

10. A system as recited in claim 1 wherein said first oven is further defined by said second heater and a third space substantially adjacent to said second heater.

11. A carpet molding system comprising:
    a support structure comprising a receiving end and an output end;
    a first oven coupled to said support structure between said receiving end and said output end comprises a first heater, said first oven receiving heat from both said first heater and a second heater such that both sides of an under-pad material are heated substantially simultaneously;

a second oven coupled to said support structure between said receiving end and said output end comprises said second heater;

a first receiving system coupled to said support structure and adapted to receive said under-pad material through said receiving end and guide said under-pad material through said first oven and through said output end;

a second receiving system coupled to said support structure and adapted to receive a carpet material through said receiving end and guide said carpet material through said second oven and through said output end;

a coupler adapted to receive said under-pad from said first oven and said carpet from said second oven and couple said under-pad to said carpet; and a molding tool adapted to receive said under-pad and said carpet simultaneously and further adapted to mold said under-pad and said carpet.

12. A system as recited in claim 11 wherein said first receiving system and said second receiving system are adapted to guide said under-pad and said carpet together, thereby coupling said under-pad to said carpet.

13. A system as recited in claim 11 further comprising:
a manual feed into said receiving end for said under-pad and said carpet.

14. A system as recited in claim 11 further comprising:
an automated feed into said receiving end for said under-pad and said carpet.

15. A system as recited in claim 11 wherein said receiving end is positioned either linear to or at an angle from said output end.

16. A system as recited in claim 11 wherein said first receiving system and said second receiving system are adjustable.

17. A system as recited in claim 11 further comprising:
a coupler adapted to receive said under-pad from said first oven and said carpet from said second oven and couple said under-pad to said carpet.

18. A system as recited in claim 10 wherein said coupler is a directed feed area or a device adapted to apply pressure to said under-pad and said carpet, thereby coupling said under-pad to said carpet.

* * * * *